US010332064B1

(12) United States Patent
Davidson (10) Patent No.: US 10,332,064 B1
(45) Date of Patent: Jun. 25, 2019

(54) METHODS, APPARATUSES AND COMPUTER PROGRAM PRODUCTS FOR IDENTIFYING DUPLICATE TRAVEL

(71) Applicant: United Parcel Service of America, Inc., Atlanta, GA (US)

(72) Inventor: Mark J. Davidson, Alpharetta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 591 days.

(21) Appl. No.: 14/046,172

(22) Filed: Oct. 4, 2013

(51) Int. Cl.
*G06Q 10/08* (2012.01)

(52) U.S. Cl.
CPC .............................. *G06Q 10/08355* (2013.01)

(58) Field of Classification Search
CPC .. G06Q 10/08; G06Q 10/08355; G06Q 10/04; G01C 21/26
USPC .......................................................... 701/400
See application file for complete search history.

(56) References Cited

U.S. PATENT DOCUMENTS

| 8,386,397 B1* | 2/2013 | Agarwal | G06Q 10/047 705/330 |
| 2008/0174485 A1* | 7/2008 | Carani | G06Q 10/08 342/357.46 |
| 2009/0143079 A1* | 6/2009 | Klassen | G01C 21/20 455/456.3 |
| 2010/0094688 A1* | 4/2010 | Olsen, III | G06Q 10/04 705/7.42 |
| 2011/0117878 A1* | 5/2011 | Barash | H04W 4/90 455/404.2 |
| 2013/0073349 A1* | 3/2013 | Kolling | G07B 15/02 705/13 |
| 2014/0167961 A1* | 6/2014 | Finlow-Bates | H04W 4/021 340/541 |

OTHER PUBLICATIONS

Comendador, Julio, María E. López-Lambas, and Andrés Monzón. "A GPS analysis for urban freight distribution." Procedia-Social and Behavioral Sciences 39 (2012): 521-533.*

* cited by examiner

*Primary Examiner* — Daniel Vetter
*Assistant Examiner* — Scott M Tungate
(74) *Attorney, Agent, or Firm* — Shook, Hardy & Bacon L.L.P.

(57) ABSTRACT

An apparatus is provided for detecting duplicate travel. The apparatus may include at least one memory and at least one processor configured to detect a travel path of a vehicle based in part on received items of location data. The processor is also configured to determine whether the travel path is associated with a defined street segment including a plurality of location points corresponding to a street. The processor is further configured to determine whether the vehicle travels the street multiple times in a predefined time period. The processor is further configured to superimpose visible indicia on the defined street segment in response to detecting that the vehicle traveled the street multiple times during the predefined time period. Corresponding computer program products and methods are also provided.

20 Claims, 7 Drawing Sheets

METHODS, APPARATUSES AND COMPUTER PROGRAM PRODUCTS FOR IDENTIFYING DUPLICATE TRAVEL

TECHNOLOGICAL FIELD

Embodiments of the invention relate generally to detecting duplicate travel and more generally relate to methods, apparatuses and computer program products for identifying duplicate travel along one or more paths.

BACKGROUND

Currently, vehicles delivering items along a street may travel along the same street multiple times in a given day. Traveling along a street multiple times in a given day for delivery of items may be inefficient since a vehicle(s) may travel more miles than necessary resulting in inefficient use of time. In addition, traveling along a street multiple times in a given time period may result in usage of more fuel thereby increasing costs associated with payment of the fuel.

As such, a need may exist for identifying duplicate travel along one or more streets.

BRIEF SUMMARY

A method, apparatus and computer program product are therefore provided for detecting duplicate travel. The exemplary embodiments may detect duplicate (e.g., multiple) travel along one or more paths (e.g., streets) associated with defined street segments. In this regard, an example embodiment may utilize the detected duplicate travel to develop travel route plans that minimize duplicate travel along a path(s) (e.g., street(s)).

By minimizing the duplicate travel along a street(s), the exemplary embodiments may serve to reduce a number of miles driven by a vehicle(s) along a street(s). For example, items (e.g., packages) being delivered along a street(s) may be consolidated for delivery at the same time along a street(s) rather than traveling multiple times in a given day to deliver the items (e.g., packages) along the street(s). In this regard, for example, by traveling along the street(s) once per day, a vehicle may reduce its traveled miles along the street(s).

In addition, the detected duplicate travel along one or more streets may be utilized to identify inefficiencies of a route plan, inefficiencies or misbehavior of a driver(s) driving a vehicle along a respective street(s) and for any other suitable reasons.

In one example embodiment, a method is provided for detecting duplicate travel. The method may include detecting a travel path of a vehicle based in part on received items of location data. The method may further include determining whether the travel path is associated with a defined street segment including a plurality of location points corresponding to a street. The method may further include determining whether the vehicle travels the street multiple times in a predefined time period. The method may further include superimposing visible indicia on the defined street segment in response to detecting that the vehicle traveled the street multiple times during the predefined time period.

In another example embodiment, an apparatus is provided for detecting duplicate travel. The apparatus may include a processor and a memory including computer program code. The memory and computer program code are configured to, with the processor, cause the apparatus to at least perform operations including detecting a travel path of a vehicle based in part on received items of location data. The memory and computer program code are also configured to, with the processor, cause the apparatus to detect a travel path of a vehicle based in part on received items of location data. The memory and computer program code are also configured to, with the processor, cause the apparatus to determine whether the travel path is associated with a defined street segment including a plurality of location points corresponding to a street. The memory and computer program code are also configured to, with the processor, cause the apparatus to determine whether the vehicle travels the street multiple times in a predefined time period. The memory and computer program code are also configured to, with the processor, cause the apparatus to superimpose visible indicia on the defined street segment in response to detecting that the vehicle traveled the street multiple times during the predefined time period.

In yet another example embodiment, a computer program product is provided for detecting duplicate travel. The computer program product includes at least one computer-readable storage medium having computer-executable program code instructions stored therein. The computer-executable program code instructions may include program code instructions configured to detect a travel path of a vehicle based in part on received items of location data. The computer program product may further include program code instructions configured to determine whether the travel path is associated with a defined street segment including a plurality of location points corresponding to a street. The computer program product may further include program code instructions configured to determine whether the vehicle travels the street multiple times in a predefined time period. The computer program product may further include program code instructions configured to superimpose visible indicia on the defined street segment in response to detecting that the vehicle traveled the street multiple times during the predefined time period.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION

Various example embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, "duplicate travel" may denote travel by a vehicle(s) along a path(s) (e.g., a street(s)), corresponding to a street segment(s), multiple times (e.g., two or more, three or more, four or more, etc.) within a specified time period. In addition, in some example embodiments, "duplicate travel" may also denote travel by a vehicle along a street segment(s), that may be associated with a segment identifier (ID), in an instance in which the vehicle subsequently turns around (e.g., a 360° turn) and continues or resumes travel along the same street segment(s).

I. EXEMPLARY SYSTEM ARCHITECTURE

The system may include one or more mobile assets 100, one or more imaging devices 105, one or more carrier communication devices 110, one or more Global Positioning System (GPS) satellites 115, one or more networks 135, one or more radio frequency identification (RFID) readers/interrogators 140, one or more mobile devices 150, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

a. Exemplary Mobile Asset

In various embodiments, a mobile asset 100 may be a tractor, truck, vehicle, a trailer, a tractor and trailer combination, a van, a flatbed truck, a delivery vehicle, and/or the like. In one embodiment, each mobile asset 100 may be associated with a unique mobile asset identifier (such as a mobile asset ID) that uniquely identifies the mobile asset 100. The mobile asset 100 may be mobile in the sense that it may be able to move from one location to another under its own power. The unique mobile asset ID (e.g., trailer ID, tractor ID, vehicle ID, and/or the like) may include characters, such as numbers, letters, symbols, and/or the like. For example, an alphanumeric mobile asset ID (e.g., "1221A445533AS445") may be associated with each mobile asset 100. In another example embodiment, the unique mobile asset ID may be the license plate, registration number, or other identifying information assigned to the mobile asset 100. FIG. 1 represents an embodiment in which the mobile asset 100 is a tractor, a trailer, or a tractor and trailer combination.

Figure 1:
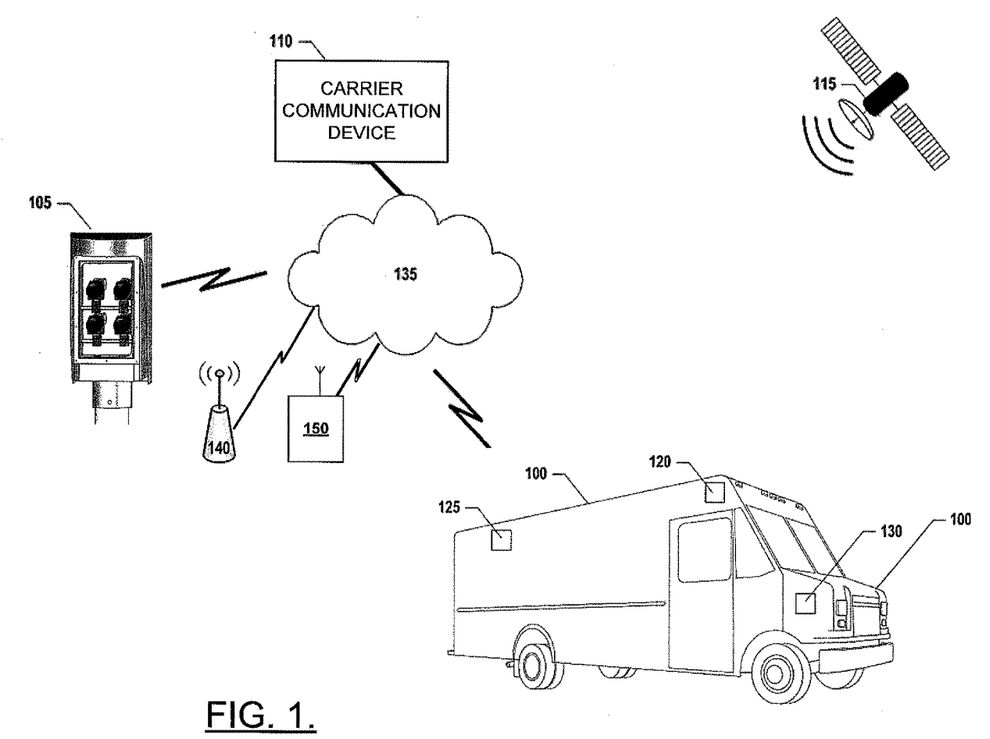
FIG. 1 is an overview of a system that can be used to practice embodiments of the invention.

FIG. 1 shows one or more computing entities, devices, and/or similar words used herein interchangeably that are associated with the mobile asset 100, such as an information/data collection device 130 or other computing entities. The data collection device 130 that may be attached, affixed, disposed upon, integrated into, or part of a mobile asset 100. The information/data collection device 130 may collect location and telematics information/data and transmit/send the information/data to the mobile device 150, and/or the carrier communication device 110 via one of several communication methods.

In one embodiment, each mobile asset 100 may have an RFID tag/sensor attached or affixed thereto that stores the corresponding mobile asset ID (e.g., trailer ID, tractor ID, vehicle ID, and/or the like). Such an RFID tag/sensor can be placed inside a mobile asset 100, or affixed to an outer surface of a mobile asset 100, for example. The RFID tags/sensors may be passive RFID tags/sensors, active RFID tags/sensors, semi-active RFID tags/sensors, battery-assisted passive RFID tags/sensors, and/or the like. Thus, the RFID tags/sensors can include some or all of the following components: one or more input interfaces for receiving information/data, one or more output interfaces for transmitting information/data, a processor, a clock, memory modules, and a power source.

In another embodiment, each mobile asset 100 may have its corresponding mobile asset ID (e.g., trailer ID, tractor ID, vehicle ID, and/or the like) visible on the exterior of the mobile asset 100. For example, the license plate number, registration number, alphanumeric characters, or other identifying information may be on the exterior of the mobile asset such that one or more imaging devices can capture an image of the mobile asset ID (e.g., trailer ID, tractor ID, vehicle ID, and/or the like) and properly identify it via analysis.

b. Exemplary Carrier Communication Device

Figure 2:
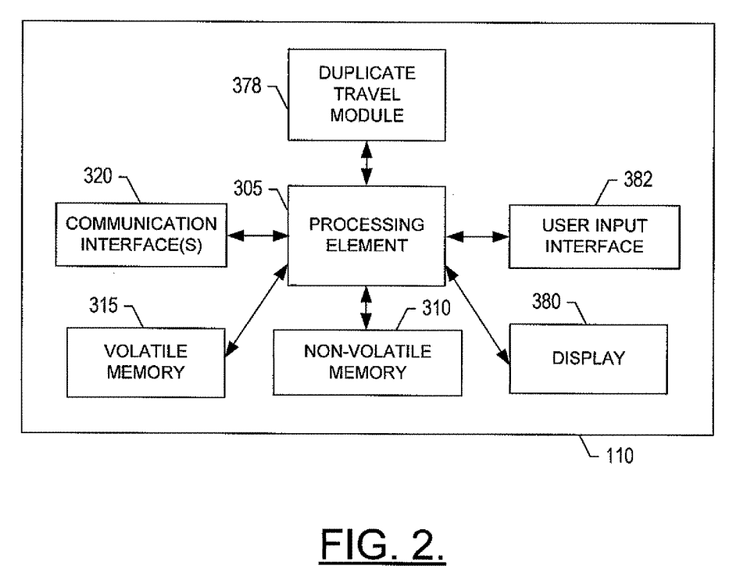
FIG. 2 is a schematic diagram of a carrier communication device according to an exemplary embodiment of the invention.

FIG. 2 provides a schematic of a carrier communication device 110 according to an example embodiment. In general, the term communication device may refer to, for example, one or more computers, computing devices, computing entities, mobile phones, desktops, tablets, notebooks, laptops, distributed systems, servers, network devices, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier communication device 110 may also include one or more communications interfaces 320 for communicating with various computing entities, such as by communicating data, content, information, and/or similar terms used herein interchangeably that can be transmitted, received, operated on, processed, displayed (e.g., via display 380), stored, and/or the like. For instance, the carrier communication device 110 may communicate with mobile assets 100, imaging devices 105, RFID interrogators/readers 140, mobile devices 150, and/or the like.

As shown in FIG. 2, in one embodiment, the carrier communication device 110 may include or be in communication with one or more processing elements 305 (also referred to as processors, processing circuitry, and/or similar terms used herein interchangeably) that communicate with other elements within the carrier communication device 110 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one example embodiment, the carrier communication device 110 may further include or be in communication with non-volatile memory 310 (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database carrier systems, information/data, applications, programs, program modules, scripts, source code, object code, byte code, compiled code, interpreted code, machine code, executable instructions, and/or the like. The term database, database instance, database carrier system, and/or similar terms used herein interchangeably may refer to a structured collection of records or information/data that is stored in a computer-readable storage medium, such as via a relational database, hierarchical database, and/or network database.

In one example embodiment, the carrier communication device 110 may further include or be in communication with volatile memory 315 (also referred to as volatile storage, memory, memory storage, memory circuitry and/or similar terms used herein interchangeably). In one example embodiment, the volatile memory 315 may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database carrier systems, information/data, applications, programs, program modules, scripts, source code, object code, byte code, compiled code, interpreted code, machine code, executable instructions, and/or the like being executed by, for example, the processing element 305. Thus, the databases, database instances, database carrier systems, information/data, applications, programs, program modules, scripts, source code, object code, byte code, compiled code, interpreted code, machine code, executable instructions, and/or the like may be used to control certain aspects of the operation of the carrier communication device 110 with the assistance of the processing element 305 and operating system.

As indicated, in one example embodiment, the carrier communication device 110 may also include one or more communications interfaces 320 for communicating with various computing entities, such as by communicating information/data, content, information, and/or similar terms used herein interchangeably that can be transmitted, received, operated on, processed, displayed, stored, and/or the like. For instance, the carrier communication device 110 may communicate with computing entities or communication interfaces of the mobile asset 100 (e.g., tractor, trailer, tractor and/or trailer, delivery vehicle), the imaging devices 105, RFID interrogators/readers 140, mobile devices 150, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier communication device 110 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the carrier communication device 110 may include or be in communication with one or more input elements, such as a keyboard input, a mouse input, a touch screen/display input, audio input, pointing device input, joystick input, keypad input, and/or the like. The carrier communication device 110 may also include or be in communication with one or more output elements (not shown), such as audio output, video output, screen/display output, motion output, movement output, and/or the like.

In addition to the communication interface(s), the interface(s) may also include at least one user interface that may include one or more earphones and/or speakers, a display 380, and/or a user input interface 382. The user input interface, in turn, may comprise any of a number of devices allowing the carrier communication device to receive data from a user, such as a microphone, a keypad, keyboard, a touch display, a joystick, image capture device, pointing device (e.g., mouse), stylus or other input device.

As will be appreciated, one or more of the components of the carrier communication device 110 may be located remotely from other components of the carrier communication device 110, such as in a distributed system. Furthermore, one or more of the components may be combined and additional components performing functions described herein may be included in the carrier communication device 110. Thus, the carrier communication device 110 may be adapted to accommodate a variety of needs and circumstances.

In an exemplary embodiment, the processing element 305 may be in communication with and may otherwise control a duplicate travel module 378. The duplicate travel module 378 may be any means such as a device or circuitry operating in accordance with software or otherwise embodied in hardware or a combination of hardware and software thereby configuring the device or circuitry (e.g., a processor, controller, microprocessor or the like) to perform the corresponding functions of the duplicate travel module 378, as described below. In one example embodiment, the duplicate travel module may, but need not, be employed in a special purpose chip such as, for example, an application-specific integrated circuit (ASIC) or a field-programmable gate array (FPGA). In examples in which software is employed, a device or circuitry (e.g., processing element 305 in one example) executing the software forms the structure associated with such means. As such, for example, the duplicate travel module 378 may be configured to, among other things, detect or identify duplicate travel of a vehicle (e.g., mobile asset 100) along one or more streets associated with a defined street segment(s), as described more fully below. In addition, the duplicate travel module 378 may detect or identify travel of a vehicle along a street segment(s), that may be associated with a segment identifier (ID), in an instance in which the vehicle subsequently turns around (e.g., a 360° turn) and continues or resumes travel along the same street segment(s). In this regard, the duplicate travel module 378 may measure the number of turn around events on a driver's route. The duplicate travel module 378 may also locate where one or more turn around events occurred. Furthermore, the duplicate travel module 378 may provide visible indicia to an interface or the display 380 indicating one or more turn around events to enable the turn around events to be shown on the display 380.

c. Exemplary Mobile Device

Figure 3:
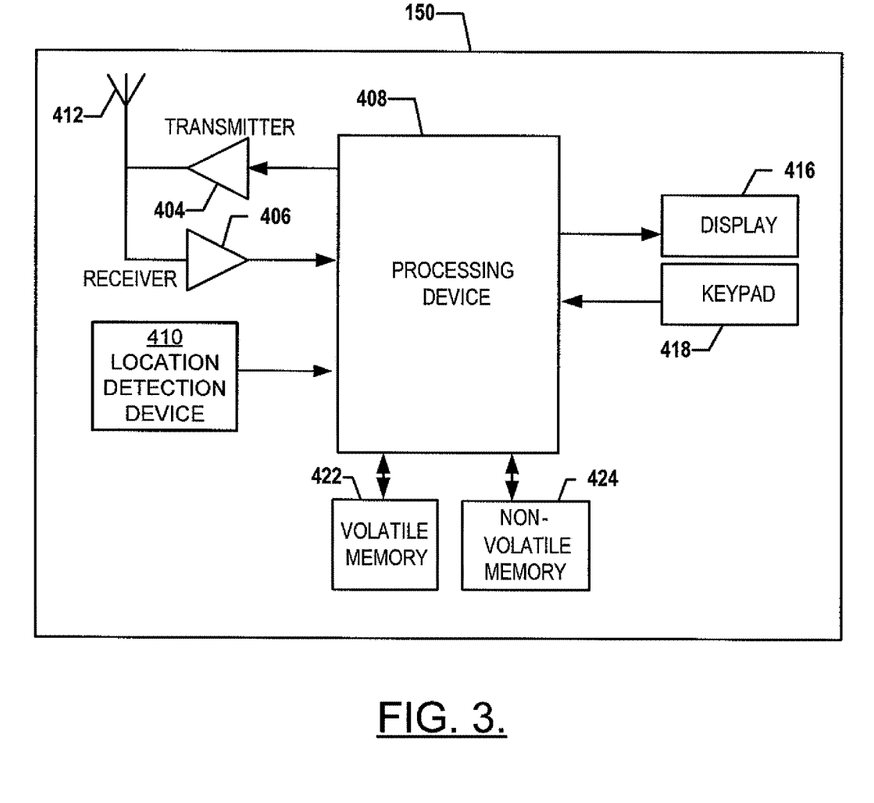
FIG. 3 is a schematic block diagram of a mobile device in accordance with an exemplary embodiment of the invention.

FIG. 3 provides an illustrative schematic representative of a mobile device 150 (e.g., in-mobile-asset device, FDT2 device) that can be used in conjunction with embodiments of the present invention. Mobile devices 150 can be operated by various parties, including operators of mobile assets 100. As shown in FIG. 3, a mobile device 150 (e.g., in-mobile-asset device, FDT2 device, etc.) may include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as mobile assets 100, imaging devices 105, carrier communication device 110, RFID interrogators/readers 140, and/or the like. In this regard, the mobile device 150 (e.g., in-mobile-asset device, FDT2 device, etc.) may be capable of operating with one or more air interface standards, communication protocols, modulation types, and access types. More particularly, the mobile device 150 (e.g., in-mobile-asset device, FDT2 device, etc.) may operate in accordance with any of a number of wireless communication standards and protocols. In a particular embodiment, the mobile device 150 (e.g., in-mobile-asset device, FDT2 device, etc.) may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

According to one embodiment, the mobile device 150 (e.g., in-mobile-asset device, FDT2 device, etc.) may include a location determining device 410 (also referred to herein as location detection device 410) and/or functionality. For example, the location detection device 410 may include a GPS module adapted to acquire, for example, latitude, longitude, altitude, geocode, course, and/or speed data (e.g., speed data of mobile asset 100). The location detection device 410 may also determine a heading direction (e.g., a heading direction(s) of mobile asset 100). In this regard, the location detection device 410 may be any means such as a device or circuitry embodied in either hardware or a combination of hardware and software that is configured to determine the speed of the mobile device 150 as well as a position(s) or location(s) of the mobile device 150. The location detection device 410 may determine the speed in which the mobile device 50 is moving or traveling along a path or route, for example through timed location updates. For instance, the location detection device 410 is configured to determine the speed in which the mobile device 150 is traveling based on changes in position at respective times. As such, the location detection device 410 is configured to determine the time that it takes the mobile device 150 to move from a first location to a second location in order to determine the speed in which the mobile device 150 is moving or traveling. In this regard, the location detection device 410 may determine the speed in which a vehicle (e.g., mobile asset 100) is moving or traveling along a path or route in an instance in which the mobile device 150 is within the vehicle as it moves or travels. In one example embodiment, the GPS module acquires information/data, sometimes known as ephemeris information/data, by identifying the number of satellites in view and the relative positions of those satellites.

The mobile device 150 (e.g., in-mobile-asset device, FDT2 device, etc.) may also comprise a user interface (that may include a display 416 coupled to a processing element 408) and/or a user input interface (coupled to a processing element 408). The user input interface may comprise any of a number of devices allowing the mobile device 150 (e.g., in-mobile-asset device, FDT2 device, etc.) to receive information/data, such as a keypad 418 (e.g., hard or soft), a touch display, voice or motion interfaces, a barcode reader, a RFID tag reader, and/or other input device. In example embodiments including a keypad 418, the keypad 418 may include (or cause display of) the conventional numeric (0-9) and related keys (#, *), and other keys used for operating the mobile device 150 (e.g., in-mobile-asset device, FDT2 device, etc.) and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 150 (e.g., in-mobile-asset device, FDT2 device, etc.) may also include volatile storage or memory 422 and/or non-volatile storage or memory 424, which may be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory may store databases, database instances, database carrier systems, information/data, applications, programs, program modules, scripts, source code, object code, byte code, compiled code, interpreted code, machine code, executable instructions, and/or the like to implement the functions of the mobile device 150 (e.g., in-mobile-asset device, FDT2 device, etc.).

d. Exemplary Imaging Devices

The imaging devices 105 may also be connected to (or include) a network interface (e.g., the wireless Ethernet bridge) for communicating with various computing entities. In one embodiment, the imaging devices 105 can communicate with the carrier communication device 110 using protocols and stacks, such as sockets. The network interface may provide the ability for each imaging device 105 to serve as a web host with, for example, web pages that can be used to setup and configure the imaging devices 105. Moreover, via the web pages (or via the carrier communication device 110), the imaging devices 105 can provide a live view of the zones of interest, which can be used to aim and focus the imaging devices 105. This may also provide the functionality of controlling the exposure, gain, gamma, white balance, compression, and numerous other attributes of the imaging devices 105. Thus, via the network interface, the imaging devices 105 may provide access for a user to (a) remotely configure (e.g., control the exposure, gain, gamma, and white balance of the images) the imaging devices 105; (b) remotely access captured images; or (c) synchronize the time on the imaging devices 105 to a consistent network time.

II. EXEMPLARY SYSTEM OPERATION

Reference will now be made to example embodiments of a system for generating one or more street segments. The street segments and associated data (e.g., street segment attribute data) may be utilized in part to detect or identify duplicate travel of a vehicle(s) along a street(s) associated with a street segment(s), as described more fully below.

a. Generating Street Segments

Figure 4:
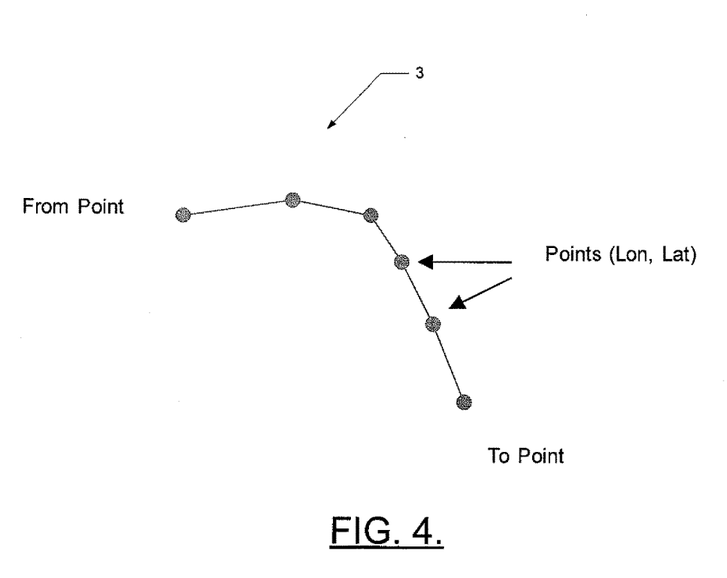
FIG. 4 is a diagram illustrating a street segment according to an exemplary embodiment of the invention.

Referring now to FIG. 4, a diagram illustrating a street segment is provided according to an exemplary embodiment. The street segments of the exemplary embodiments may be generated based in part on street segment attributes and/or definitions, as described more fully below.

In the example embodiment of FIG. 4, the duplicate travel module 378 may generate a street segment 3 having multiple points (e.g., six points). In some example embodiments, a street segment may include two points (e.g., a From Point and To Point). In one example embodiment, the duplicate travel module 378 may define the street segment attributes and/or definitions of the street segment 3 in response to receipt of an indication of a selection of a street(s) (e.g., from a map).

The duplicate travel module 378 may determine the longitude and latitude coordinates of the points (also referred to herein as location points) of a street segment (e.g., street segment 3). In one example embodiment the duplicate travel module 378 may define street segment attributes and/or definitions for a street segment(s) (e.g., street segment 3) to include, but not limited to, a From Point corresponding to a street segment (e.g., street segment 3) associated with a starting longitude and latitude point and a To Point of the street segment associated with an ending longitude and latitude point as well as any other suitable data.

b. Detecting Multiple Travel Corresponding to Street Segments

Figure 5A:
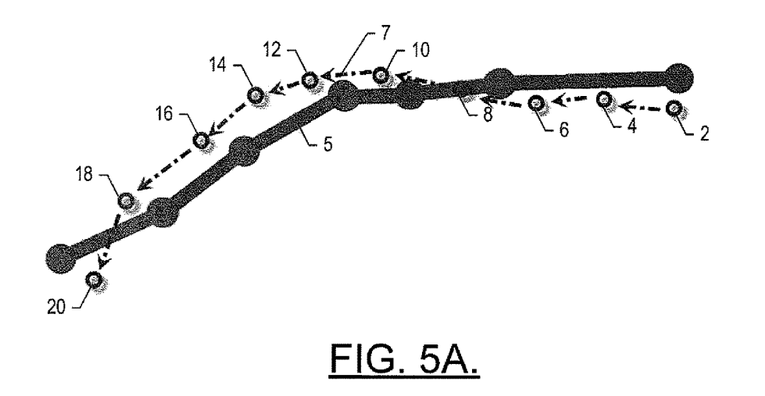
FIG. 5A is a diagram illustrating a travel path of a vehicle associated with a street segment according to an exemplary embodiment of the invention.

Referring now to FIG. 5A, a diagram illustrating detection of a vehicle traveling along a street segment is provided according to an exemplary embodiment. In the example embodiment of FIG. 5A, items of location data (also referred to herein as location (e.g., GPS) points) such as, for example, longitude and latitude points (also referred to herein as longitude and latitude coordinates) of a vehicle (e.g., mobile asset 100) traveling along a path (e.g., travel path 7 (e.g., a street) may be detected by a location detection device (e.g., location detection device 410) of a mobile device (e.g., mobile device 150). The location detection device (e.g., location detection device 410) may provide the detected location points to the duplicate travel module 378 of the carrier communication device 110. In the example embodiment of FIG. 5A, the location detection device detects location points 2, 4, 6, 8, 10, 12, 14, 16, 18 and 20 corresponding to travel of a vehicle (e.g., mobile asset 100) along a street.

The duplicate travel module 378 may evaluate the location points (e.g., location points 2, 4, 6, 8, 10, 12, 14, 16, 18 and 20) of a vehicle travel path 7 and may determine a closet street segment (e.g., street segment 5) that the vehicle (e.g., mobile asset 100) is traveling along.

Figure 5B:
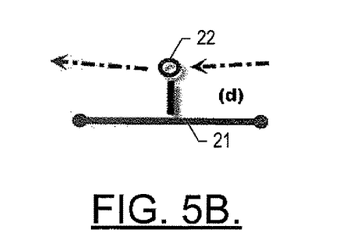
FIG. 5B is a diagram illustrating a location point of a travel path of a vehicle closest to a street segment according to an exemplary embodiment of the invention.

As shown in FIG. 5B, a location point(s) detected by the location detection device 410 as a vehicle (e.g., mobile asset 100) is traveling along a path may be associated with a street segment (associated with a corresponding street) by the duplicate travel module 378 in an instance in which the distance (e.g., perpendicular distance) to the closest street segment is within or does not exceed (e.g., is less than or equal to) a predetermined distance (d) (e.g., 25 feet (ft.), 30 feet, etc.) between a respective location point (e.g., location point 22) and the individual street segment (e.g., street segment 21).

In this regard, referring back to FIG. 5A, the duplicate travel module 378 determined that the locations points (e.g., location points 2, 4, 6, 8, 10, 12, 14, 16, 18 and 20) of travel path 7 are within the predetermined distance (e.g., 25 ft.) to the closet street segment 5, among a plurality of street segments. As such, the duplicate travel module 378 may associate travel path 7 with street segment 5 denoting that the vehicle (e.g., mobile asset 100) is traveling along a street corresponding to the street segment 5.

In addition to the location data (e.g., location points) detected by a location detection device (e.g., location detection device 410) as the vehicle travels along a path (e.g., travel path 7) (e.g., a street) or route, the location detection device may determine the speed in which the vehicle is traveling along the path, the total distance in which the vehicle is traveling along the path, the heading or direction in which the vehicle is traveling, a vehicle ID (e.g., a mobile asset ID (e.g., "1221A445533AS445")) of the vehicle (e.g., mobile asset 100) the time in which each of the location points were captured and the duration of the travel. The duration of the travel may be determined by the location detection device (e.g., location detection device 410) by analyzing the time in which an initial location point (e.g., location point 2) is detected and the time in which a final location point (e.g., location point 20) is detected along a travel path (e.g., travel path 7).

In addition, the location detection device may determine the total distance (e.g., total miles) traveled along a path by determining the miles between the initial location point (e.g., location point 2) detected and the final location point (e.g., location point 20) detected along the path (e.g., travel path 7).

In an example embodiment, the location detection device may determine the heading or direction in which a vehicle (e.g., mobile asset 100) is traveling by analyzing location data (e.g., latitude and longitude coordinates) of each of two contiguous or successive location points (e.g., location points 2 and 4, locations points 4 and 6, location points 6 and 8, etc.) along the travel path (e.g., travel path 7). Additionally, in an example embodiment, the location detection device 410 may obtain the vehicle ID of the vehicle traveling along a path from an RFID tag/sensor storing the vehicle ID or an imaging device 105 that captured an image of the vehicle ID.

The location detection device 410 may associate the speed, total distance traveled, vehicle ID, heading or direction, time, duration and any other suitable data with the location data of the location points (e.g., latitude and longitude coordinates) and may provide this information to the duplicate travel module 378 of the carrier communication device 110.

In an example embodiment, for each location point, the duplicate travel module 378 may determine a number of times a vehicle(s) traversed an individual street segment(s) in each direction. In this regard, in response to the duplicate travel module 378 detecting that a vehicle traveled along a path (e.g., a street) corresponding to a street segment multiple times, the duplicate travel module may highlight the corresponding street segment. In this manner, the duplicate travel module may provide or superimpose indicia (e.g., visible indicia) on the corresponding street segment to highlight the corresponding street segment denoting that a vehicle traveled along a street corresponding to the street segment multiple times (e.g., two times, three times, four times, etc.). The duplicate travel module 378 may provide instructions to a display (e.g., display 380) to show the superimposed indicia (e.g., highlighted data of the street segment).

Figure 6:
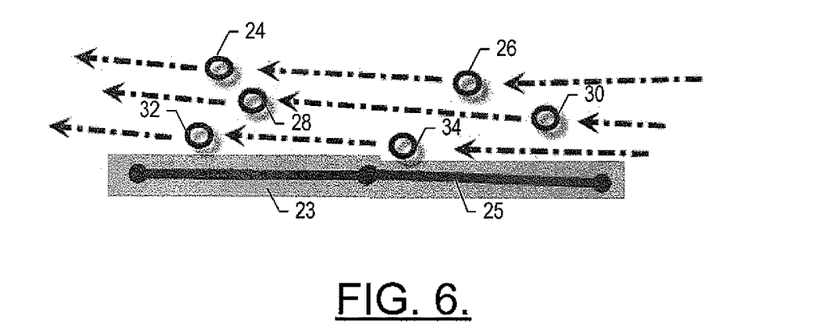
FIG. 6 is a diagram illustrating a street segment corresponding to a street being traveled multiple times by a vehicle according to an exemplary embodiment.

Referring now to FIG. 6, a diagram illustrating a street segment being traversed multiple times is provided according to an example embodiment. In the example embodiment of FIG. 6, the duplicate travel module 378 analyzed location points (e.g., location points 24, 26, 28, 30, 32, and 34) and/or associated data (e.g., speed data, vehicle ID, heading/direction data, indications of times in which location points were detected, duration of travel data, distance of travel data, etc.) and determined that a vehicle (e.g., mobile asset 100) traveled along a street corresponding to a street segment 25 three different times in a given time period (e.g., within a given day). In this regard, the duplicate travel module 378 may associate or superimpose indicia 23 (e.g., visible indicia) on the street segment 25 highlighting the street segment 25 and may provide the indicia to a display (e.g., display 380) to enable the display to show the highlighted street segment 25. In some example embodiments, the highlighted street segment(s) may be shown on a display (e.g., display 380) with indications depicting the multiple instances in which the vehicle traveled along a street corresponding to the highlighted street segment(s). In some other example embodiments, the highlighted street segment(s) may be shown on the display without showing indications depicting the multiple instances in which the vehicle traveled along the street corresponding to the highlighted street segment(s).

Additionally, in some example embodiments detection, by the duplicate travel module 378, of travel of a vehicle along a path (e.g., a street) corresponding to a street segment multiple times, in a specified time period, in the same heading or direction may be designated as duplicate travel. However, in some other example embodiments detection, by the duplicate travel module 378, of travel of a vehicle along a path (e.g., a street) corresponding to a street segment multiple times, in a given time period, in different headings or directions may be designated as duplicate travel.

In addition, in some example embodiments, the duplicate travel module 378 may designate that duplicate travel for highlighting a street segment may occur in an instance in which a vehicle travels along a street corresponding to a street segment, in a specified (e.g., predefined) time period, two or more times. However, in some other example embodiments, the duplicate travel module 378 may designate that duplicate travel for highlighting a street segment may occur in an instance in which a vehicle travels along a street corresponding to a street segment more than two times (e.g., three times, four times, etc.).

In an example embodiment, the duplicate travel module 378 may detect multiple travel by one or more vehicles along respective streets associated with corresponding street segments and may provide/superimpose indicia (e.g., visible indicia) on one or more street segments and may instruct a display to show multiple highlighted street segments depicting the detected multiple travel. In this example embodiment, receipt of an indication of a selection (e.g., selection of a menu, button, tab or the like) via a user interface (e.g., user input interface 382) may trigger the duplicate travel module 378 to instruct the display to show the multiple highlighted street segments. In this regard, the duplicate travel module 378 may detect the total number of street segments associated with the highlighted street segments and may determine the total time traveled by the vehicles, the total distance traveled by the vehicles as well as the speeds traveled by the vehicles traveling along paths (e.g., streets) corresponding to the highlighted street segments.

By analyzing a highlighted street segment(s) on a display denoting multiple travel by a vehicle along a street corresponding to the street segment, the duplicate travel module 378 may denote/signify inefficiencies in a travel routing plan (e.g., a routing plan for pickup/delivery of items (e.g., packages)) and/or inefficiencies in driver behavior.

As an example, consider an instance in which the duplicate travel module 378 detected multiple travel by a vehicle along a path (e.g., a street) corresponding to a street segment for a given day according to a route plan. For instance, consider that the vehicle was scheduled according to the route plan to deliver items (e.g., packages) along a street associated with a corresponding street segment in the morning, then travel to the street at noon for delivery of next day delivery items and subsequently travel again to the street in the evening for pickup of items. In this regard, the detection of multiple travel by the duplicate travel module 378 may denote that the route plan is inefficient. In this regard, the highlighted segment indicated on a display (e.g., display 380) may denote an opportunity to plan a more efficient route which may reduce the miles traveled along a street associated with the corresponding highlighted street segment.

For example, the indication of the highlighted street segment may trigger a more efficient route to be designated in which items (e.g., packages) are consolidated for delivery by the vehicle such that the vehicle travels once to the street, corresponding to the highlighted street segment, during a specified time period (e.g., during a given day) for delivery and/or pickup of items. By traveling once along the street during the specified time period, the number of miles traveled along the street by the vehicle may be reduced.

As another example, consider an instance in which a route plan specifies travel of a vehicle once to a street corresponding to a street segment but the duplicate travel module 378 detects multiple travel by the vehicle to the street during a specified time period (e.g., a given day). In this regard, the detection of the multiple travel of the vehicle along the street corresponding to the street segment may denote inefficient driver behavior or driver misbehavior. For instance, in this example, consider that the driver did not follow the route plan and drove the vehicle multiple times to the street. As such, detection of the multiple travel by the duplicate detection module 378 may be utilized to trigger corrective action to address driver misbehavior and to discuss with the driver the reasons for departing from the route plan and reinforcing the need to follow the route plan.

Figure 7:
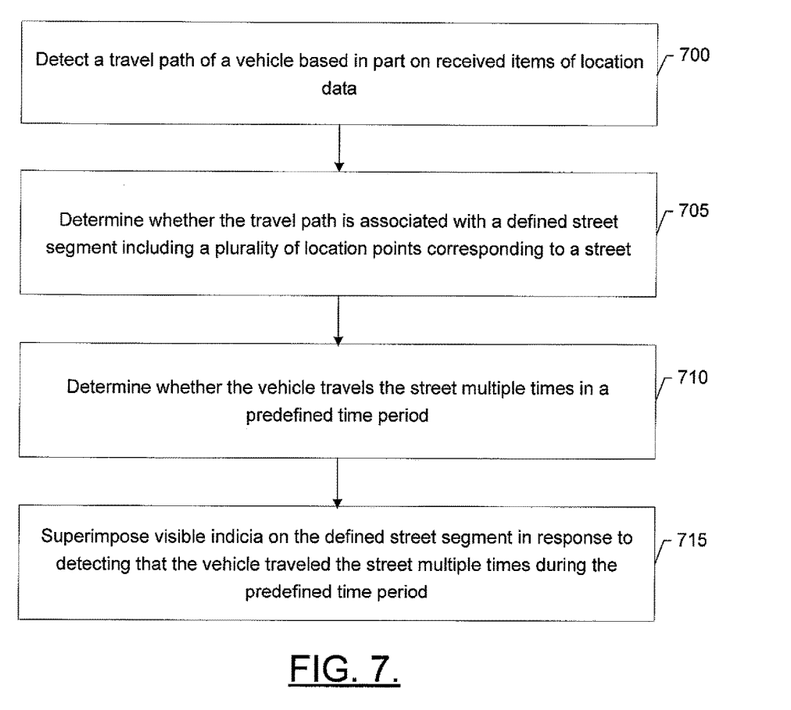
FIG. 7 is a flowchart illustrating operations and processes that may be used in accordance with various embodiments of the invention.

Referring now to FIG. 7, an example embodiment of a flowchart for detecting duplicate travel is provided according to an example embodiment. At operation 700, an apparatus (e.g., carrier communication device 110) may detect a travel path (e.g., travel path 7) of a vehicle (e.g., mobile asset 100) based in part on received items of location data (e.g., longitude and latitude points/coordinates). At operation 705, the apparatus (e.g., carrier communication device 110) may determine whether the travel path is associated with a defined street segment (e.g., street segment 25) including a plurality of location points (e.g., longitude and latitude points/coordinates) corresponding to a street.

At operation 710, the apparatus (e.g., carrier communication device 110) may determine whether the vehicle travels the street multiple times in a predefined time period (e.g., during a specified day). At operation 715, the apparatus (e.g., carrier communication device 110) may superimpose visible indicia (e.g., indicia 23 (e.g., highlighted data)) on the defined street segment (e.g., street segment 25) in response to detecting that the vehicle traveled the street multiple times during the predefined time period.

It should be pointed out that FIG. 7 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., volatile memory 315, non-volatile memory 310, volatile memory 422, non-volatile memory 424) and executed by a processor (e.g., processing element 305, duplicate travel module 378, processing device 408). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 7 above may comprise a processor (e.g., processing element 305, duplicate travel module 378, processing device 408) configured to perform some or each of the operations (700-715) described above. The processor may, for example, be configured to perform the operations (700-715) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (700-715) may comprise, for example, the processing element 305 (e.g., a processor) (e.g., as means for performing any of the operations described above), the duplicate travel module 378, the processing device 408 and/or a device or circuitry for executing instructions or executing an algorithm for processing information as described above.

III. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   detecting, via a carrier communication device, items of vehicle telematics data, captured from a telematics device affixed to a vehicle and transmitted over a wired or wireless computer network to the carrier communication device, the vehicle telematics data indicating GPS coordinate locations of the vehicle, a speed of the vehicle and a direction of the vehicle while the vehicle is traveling a route;
   based at least on the vehicle telematics device capturing the telematics data, providing visible data, to a display device of the carrier communication device, the display device visibly indicating the GPS coordinate locations of the vehicle and the direction of travel of the vehicle while the vehicle is traveling the route;
   detecting, via the carrier communication device, a travel path of the vehicle and a route plan based on the telematics device capturing and transmitting the items of telematics data over the wired or wireless network to the carrier communication device;
   by the carrier communication device, determining, based at least on the detection of the travel path, whether the travel path is associated with a defined street segment comprising a plurality of location points corresponding to a street in response to detection of an indication of a selection of the street from a map;
   in response to determining that the travel path is associated with the defined street segment, determining, via the carrier communication device, geocoordinates of the location points corresponding to the street and displaying, via the display device, the location points of the street in the visible data;

determining, via the carrier communication device, a number of times the vehicle travels the street within a predefined time period based at least on the telematics device capturing and transmitting the telematics data over the wired or wireless network;

receiving, within a graphical user interface of the display device, a user selection of a feature that causes the display device to display the defined street segment;

based at least on the telematics device capturing and transmitting the telematics data over the wired or wireless network, superimposing, to the display device and in response to the user selection of the feature, visible indicia on the defined street segment to highlight the defined street segment with visible content, displayed with the visible data indicating (i) the locations of the vehicle and the direction of travel of the vehicle while the vehicle travels the route and (ii) the location points corresponding to the street, via the display device of the communication device, in response to detecting that the vehicle traveled the street multiple times during the predefined time period, the superimposed visible indicia denotes that the vehicle traveled the street multiple times during the predefined time period, the superimposed visible indicia corresponds to one or more travel inefficiencies of the defined street segment for the route plan; and modifying, in response to analyzing the superimposed visible indicia, the route plan, the modifying allows a reduction in a quantity of times the vehicle travels down the street corresponding to the defined street segment.

2. The method of claim 1, further comprising:
determining that the travel path is associated with the defined street segment in response to detecting that the items of location data corresponding to the travel path are within a predetermined distance to the defined street segment denoting that the defined street segment is a closest street segment, among a plurality of defined street segments, to the travel path.

3. The method of claim 1, further comprising:
providing visible data to the superimposed visible indicia indicating, via the display device, multiple instances in which the vehicle traveled the street corresponding to the highlighted defined street segment.

4. The method of claim 1, wherein:
the displayed superimposed visible indicia denotes one or more inefficiencies or misbehavior of a driver driving the vehicle along the street.

5. The method of claim 2, wherein the predetermined distance is configurable and the method further comprises:
changing the predetermined distance to another designated distance.

6. The method of claim 1, further comprising:
associating the items of location data with data indicating at least one of an identifier of the vehicle, a speed of the vehicle traveling along the path, a heading or direction of the vehicle, a distance that the vehicle traveled along the path, indications of times in which the items of location data were detected, or a duration of time in which the vehicle traveled along the path.

7. The method of claim 1, wherein:
the multiple times comprises three or more times.

8. An apparatus comprising at least one processor and at least one memory including computer program code, the at least one memory and the computer program code configured to, with the processor, cause the apparatus to at least:

detect items of vehicle telematics data, captured from a telematics device affixed to a vehicle and transmitted over a wired or wireless computer network to the apparatus, the vehicle telematics data indicating locations of the vehicle, a speed of the vehicle and a direction of the vehicle while the vehicle is traveling a route;

provide visible data, to a display device of the apparatus, visibly indicating the locations of the vehicle and the direction of travel of the vehicle while the vehicle is traveling the route;

detect a travel path of the vehicle and generate a route plan based in part on the telematics device capturing and transmitting the items of telematics data over the communications network to the apparatus;

determine, based at least on the detection of the travel path, whether the travel path is associated with a defined street segment comprising a plurality of location points corresponding to a street in response to detection of an indication of a selection of the street from a map;

determine geocoordinates of the location points corresponding to the street and display, via the display device, the location points of the street in the visible data;

determine a number of times the vehicle travels the street within a predefined time period based at least on the telematics device capturing and transmitting the telematics data over the communications network;

superimpose, based at least on the telematics device capturing and transmitting the telematics data over the communications network, visible indicia on the defined street segment to highlight the defined street segment, displayed with the visible data indicating (i) the locations of the vehicle and the direction of travel of the vehicle while the vehicle travels the route and (ii) the location points corresponding to the street, via the display device of the apparatus, in response to detecting that the vehicle traveled the street multiple times during the predefined time period, the superimposed visible indicia denotes that the vehicle traveled the street multiple times during the predefined time period; and modify, in response to analyzing the superimposed visible indicia and detecting that the vehicle has traveled the street multiple times, the route plan, the modifying includes regenerating a second route plan, the regeneration of the second route plan allows the vehicle to reduce and consolidate trips for package delivery.

9. The apparatus of claim 8, wherein the memory and computer program code are further configured to, with the processor, cause the apparatus to:
determine that the travel path is associated with the defined street segment in response to detecting that the items of location data corresponding to the travel path are within a predetermined distance to the defined street segment denoting that the defined street segment is a closest street segment, among a plurality of defined street segments, to the travel path.

10. The apparatus of claim 8, wherein the memory and computer program code are further configured to, with the processor, cause the apparatus to:
provide visible data to the superimposed visible indicia indicating, via the display device, multiple instances in which the vehicle traveled the street corresponding to the highlighted defined street segment.

11. The apparatus of claim 8, wherein:
the displayed superimposed visible indicia denotes one or more inefficiencies in a route plan defined for pickup or delivery of items along the street.

12. The apparatus of claim 8, wherein:
the displayed superimposed visible indicia denotes one or more inefficiencies or misbehavior of a driver driving the vehicle along the street.

13. The apparatus of claim 9, wherein the predetermined distance is configurable and wherein the memory and computer program code are further configured to, with the processor, cause the apparatus to:
change the predetermined distance to another designated distance.

14. The apparatus of claim 8, wherein the memory and computer program code are further configured to, with the processor, cause the apparatus to:
associate the items of location data with data indicating at least one of an identifier of the vehicle, a speed of the vehicle traveling along the path, a heading or direction of the vehicle, a distance that the vehicle traveled along the path, indications of times in which the items of location data were detected, or a duration of time in which the vehicle traveled along the path.

15. The apparatus of claim 8, wherein:
the multiple times comprises three or more times.

16. A computer program product comprising at least one non-transitory computer-readable storage medium having computer-executable program code instructions stored therein, the computer-executable program code instructions comprising:
program code instructions configured to detect items of vehicle telematics data, captured from a telematics device, the vehicle telematics data indicating locations of the vehicle, a speed of the vehicle and a direction of the vehicle while the vehicle is traveling a route;
program code instructions configured to provide visible data, to a display device of a communication device, visibly indicating the locations of the vehicle and the direction of travel of the vehicle while the vehicle is traveling the route;
program code instructions configured to detect a travel path of the vehicle based in part on the items of location data;
program code instructions configured to determine whether the travel path is associated with a defined street segment comprising a plurality of location points corresponding to a street in response to detection of an indication of a selection of the street from a map;
program code instructions configured to determine geo-coordinates of the location points corresponding to the street and display, via the display device, the location points of the street in the visible data;
program code instructions configured to determine a number of times the vehicle travels the street within a predefined time period; and
program code instructions configured to superimpose visible indicia on the defined street segment to highlight the defined street segment with visible content, displayed with the visible data indicating (i) the locations of the vehicle and the direction of travel of the vehicle while the vehicle travels the route and (ii) the location points corresponding to the street, via the display device of the communication device, in response to detecting that the vehicle traveled the street multiple times during the predefined time period, the superimposed visible indicia denotes that the vehicle traveled the street multiple times during the predefined time period.

17. The computer program product of claim 16, further comprising:
program code instructions configured to determine that the travel path is associated with the defined street segment in response to detecting that the items of location data corresponding to the travel path are within a predetermined distance to the defined street segment denoting that the defined street segment is a closest street segment, among a plurality of defined street segments, to the travel path.

18. The computer program product of claim 16, further comprising:
program code instructions configured to provide visible data to the superimposed visible indicia indicating, via the display device, multiple instances in which the vehicle traveled the street corresponding to the highlighted defined street segment.

19. The computer program product of claim 16,
wherein: the displayed superimposed visible indicia denotes one or more inefficiencies in a route plan defined for pickup or delivery of items along the street.

20. The computer program product of claim 16, wherein:
the multiple times comprises three or more times.

* * * * *